United States Patent
Lekatsas et al.

(10) Patent No.: US 7,474,750 B2
(45) Date of Patent: Jan. 6, 2009

(54) DYNAMIC CONTENT-AWARE MEMORY COMPRESSION AND ENCRYPTION ARCHITECTURE

(75) Inventors: Haris Lekatsas, Princeton, NJ (US); Joerg Henkel, Exton, PA (US); Srimat Chakradhar, Manalapan, NJ (US); Venkata Jakkula, Monmouth Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 379 days.

(21) Appl. No.: 10/869,984

(22) Filed: Jun. 16, 2004

(65) Prior Publication Data

US 2006/0002555 A1 Jan. 5, 2006

(51) Int. Cl.
*H04K 1/00* (2006.01)
(52) U.S. Cl. .................. 380/269; 380/217; 710/68; 707/101
(58) Field of Classification Search .......... 380/217, 380/269; 710/68; 707/101
See application file for complete search history.

(56) References Cited

U.S. PATENT DOCUMENTS

| | | | |
|---|---|---|---|
| 5,057,837 A | 10/1991 | Colwell et al. | |
| 5,386,469 A | 1/1995 | Yearsley et al. | |
| 5,455,576 A | 10/1995 | Clark, II et al. | |
| 5,654,703 A * | 8/1997 | Clark, II ................ | 341/51 |
| 5,761,536 A | 6/1998 | Franaszek | |
| 5,764,994 A | 6/1998 | Craft | |
| 5,812,817 A | 9/1998 | Hovis et al. | |
| 5,825,878 A | 10/1998 | Takahashi et al. | |
| 5,920,723 A | 7/1999 | Peyton, Jr. et al. | |
| 5,999,189 A | 12/1999 | Kajiya et al. | |
| 6,175,896 B1 | 1/2001 | Bui | |
| 6,195,743 B1 | 2/2001 | Elnozahy | |
| 6,202,152 B1 | 3/2001 | Yuenyongsgool et al. | |
| 6,233,674 B1 | 5/2001 | Elnozahy | |
| 6,240,419 B1 | 5/2001 | Franaszek | |
| 6,330,675 B1 * | 12/2001 | Wiser et al. ............... | 713/189 |
| 6,442,680 B1 | 8/2002 | Elnozahy | |
| 6,581,131 B2 * | 6/2003 | Vondran, Jr. ............... | 711/3 |
| 6,819,271 B2 | 11/2004 | Geiger et al. | |
| 6,822,589 B1 * | 11/2004 | Dye et al. .................. | 341/51 |
| 6,865,664 B2 * | 3/2005 | Budrovic et al. ............ | 712/209 |

OTHER PUBLICATIONS

M. Kjelso et al. "Design & Performance of a Main Memory Hardware Data Compressor", 22nd Euromicro Conference, IEEE Computer Society Press, Sep. 1996.
R.B. Tremaine et al., "IBM Memory Expansion Technology (MXT)", IBM J. Res. & Dev., vol. 45, No. 2, Mar. 2001.
L. Benini et al., "Selective Instruction Compression for Memory Energy Reduction in Embedded Systems", IEEE ISLPED—Aug. 1999.
H. Lekatsas et al., "Design of an One-Cycle Decompression Hardware for Performance Increase in Embedded Systems", DAC Jun. 2002.

(Continued)

*Primary Examiner*—Emmanuel L Moise
*Assistant Examiner*—Paul Callahan
(74) *Attorney, Agent, or Firm*—Joseph Kolodka; James Bitetto

(57) ABSTRACT

An architecture for content-aware compression and/or encryption of various segments of a application is disclosed. The architecture advantageously allows decompression and decryption units to be placed various levels of a memory hierarchy.

21 Claims, 3 Drawing Sheets

OTHER PUBLICATIONS

H. Lekatsas et al., "SAMC: A Code Compression Algorithm for Embedded Processors", IEEE Transactions on Computer-Aided Design of Integrated Circuits and Systems, Dec. 1999.

S. Ravi et al., "Tamper Resistance Mechanisms for Secure Embedded Systems", Proceedings of the 17th International Conference on VLSI Design, Jan. 2004.

L. Benini et al., "Minimizing Memory Access Energy in Embedded Systems by Selective Instruction Compression", IEEE Transactions on Very Large Scale Integration, Oct. 2002.

H. Lakatsas et al., "Code Compression for Embedded Systems", DAC Jun. 1998.

H. Lekatsas et al., "Code Compression as a Variable in Hardware/Software Co-Design", C&C Technical Report No. 2000-C020-4-5110-2, Feb. 2000.

C. Shaw et al., "A Pipeline Architecture for Encompression (Encryption + Compression) Technology", Proceedins of the 16th International Conference on VLSI Design, 2003.

G. E. Suh et al., "Efficient Memory Integrity Verification and Encryption for Secure Processors", Proceedings of the 36th International Symposium on Microarchitecture, 2003.

N. Provos, "Encrypting Virtual Memory", Proceedings of the 9th Usenix Security Symposium, Aug. 2000.

* cited by examiner

DYNAMIC CONTENT-AWARE MEMORY COMPRESSION AND ENCRYPTION ARCHITECTURE

RELATED APPLICATIONS

The present application is related to commonly-assigned United States utility patent applications "MEMORY COMPRESSION ARCHITECTURE FOR EMBEDDED SYSTEMS," Ser. No. 10/869,985, now U.S. Pat. No. 7,302,543, and "MEMORY ENCRYPTION ARCHITECTURE," Ser. No. 10/869,983, both filed contemporaneously with the present application and both of which are incorporated by reference herein.

BACKGROUND OF THE INVENTION

The present invention is related to memory architectures and, more particularly, to architectures for compression and encryption of memory.

Compression and encryption techniques are well-known. A recent development has been to use techniques such as compression to reduce the size of main memory in a computer architecture. See, e.g., M. Kjelso et al., "Main Memory Hardware Data Compression," 22$^{nd}$ Euromicro Conference, pages 423-30, IEEE Computer Society Press (September 1996). For example, researchers at IBM have developed the "MXT" architecture for servers which performs compression and decompression during runtime of an application when transferring data from the L3 cache to main memory and vice versa. See Tremaine et al., "IBM Memory Expansion Technolog (MXT)," IBM J. Res. & Dev., Vol. 45, No. 2 (March 2001). See also U.S. Pat. Nos. 5,761,536, 5,812,817, and 6,240,419, which are incorporated by reference herein. Similarly, encryption has been utilized in the prior art to protect sensitive code or data stored in memory.

Despite the advances in compression and encryption, prior art use of application compression and encryption techniques typically rely on the following constraints. First, compression/decompression and encryption/decryption is typically applied at a specific level of the memory hierarchy. Second, once that level of the memory hierarchy is pre-specified, a specific compression and/or encryption algorithm is selected, namely an algorithm that is suitable for that level of the memory hierarchy. Thus, solutions currently available will provide a compression or encryption scheme that may be optimal with regards to a portion of an application's code or data but that may be suboptimal with regards to much of the rest of the application code or data. This is particularly of concern in embedded systems, where space constraints and security issues typically exist.

Accordingly, there is a need for an architecture that can handle compression and encryption in a more flexible and efficient manner.

SUMMARY OF INVENTION

The present invention is directed to a methodology for compression/encryption that is content-aware. In accordance with an embodiment of the invention, compression/decompression and encryption/decryption are done in multiple locations within the various levels of a memory hierarchy. Applications are segmented into different areas that can be compressed and/or encrypted using different algorithms. Critical segments that must be executed fast can be left uncompressed while other segments which are less critical but which are highly compressible can be compressed. Sensitive data areas can be encrypted while other less sensitive areas can be left unencrypted for speed of execution. Different compression and/or encryption schemes can be used for the various segments to maximize compressibility and performance.

The present invention provides the flexibility to treat different regions of the application using different strategies and provides the ability to carry out such decisions dynamically during execution. These and other advantages of the invention will be apparent to those of ordinary skill in the art by reference to the following detailed description and the accompanying drawings.

DETAILED DESCRIPTION

Figure 1:
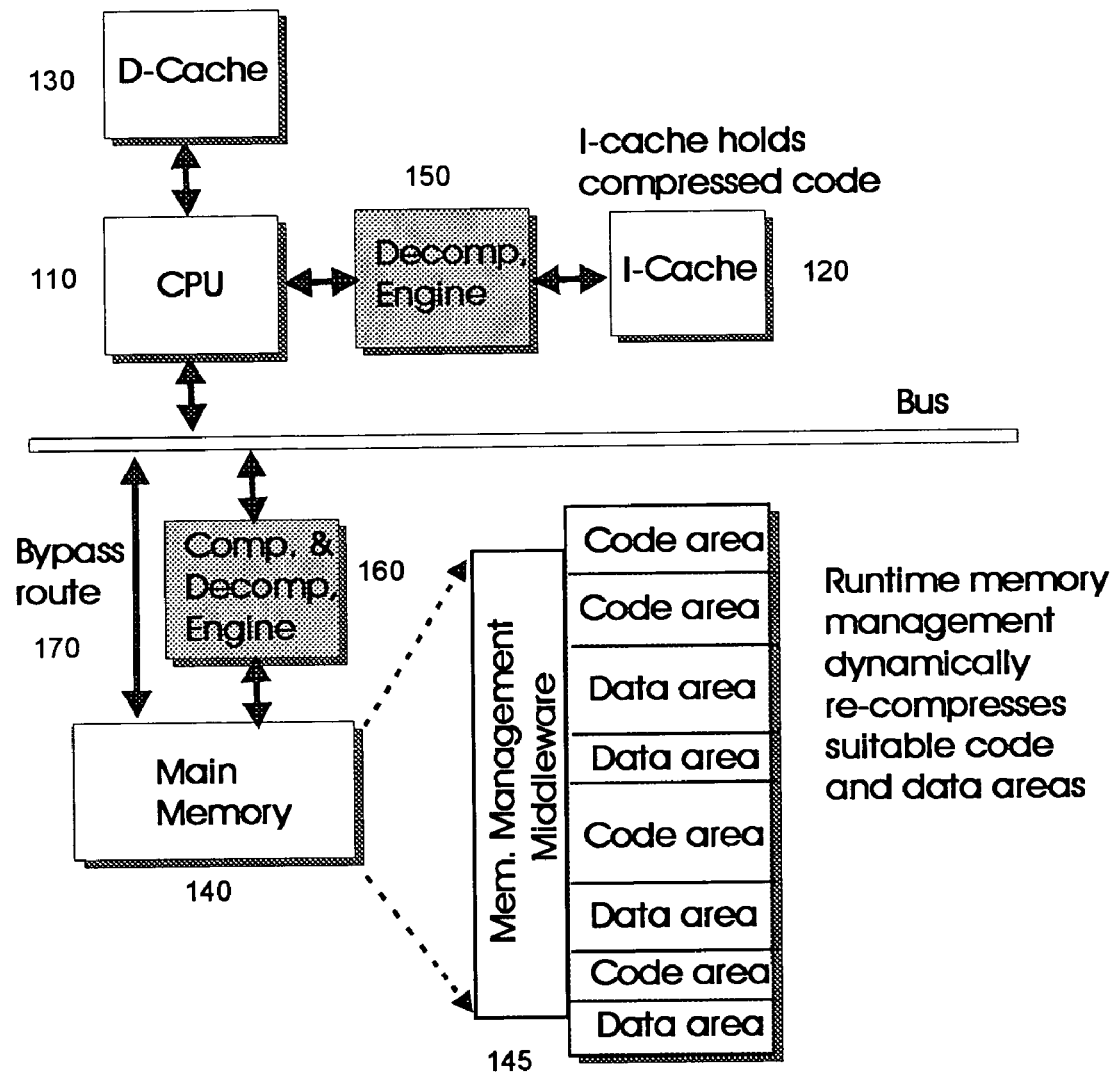
FIG. 1 is an example architecture illustrating different aspects of the invention.

FIG. 1 is a diagram of an example architecture that illustrates dynamic application partitioning and the use of compression/decompression at various levels of a memory hierarchy. A processor (CPU) 110 is depicted in FIG. 1 which includes an instruction cache 120 and a data cache 130. The processor 110 has a bus which connects it to main memory 140. The processor 110, notably, can be any conventional microprocessor and advantageously does not need to be modified in order to be utilized in the context of the present invention.

It should be noted that the memory hierarchy depicted in FIG. 1 is only illustrative. The techniques disclosed herein can be readily utilized in other memory hierarchies with different (or no) caching architectures.

In accordance with an embodiment of an aspect of the invention, compression is integrated into the architecture shown in FIG. 1 at two levels of the memory hierarchy—while advantageously segmenting both code and data into various areas. Most code areas are stored in compressed format in both the instruction cache 120 and the main memory 140. A decompression engine 150 is placed between the instruction cache 120 and the processor 110. If code is not modified during runtime, a compression engine is not required to be integrated with the decompression engine 150. In contrast, most data areas are stored in compressed format in main memory 140 while in decompressed format in the data cache 130. Therefore, a compression/decompression engine 160 is required which is placed between main memory 140 and the CPU/data cache. Note that since data needs to be written during runtime, a compression engine is also necessary.

Figure 2:
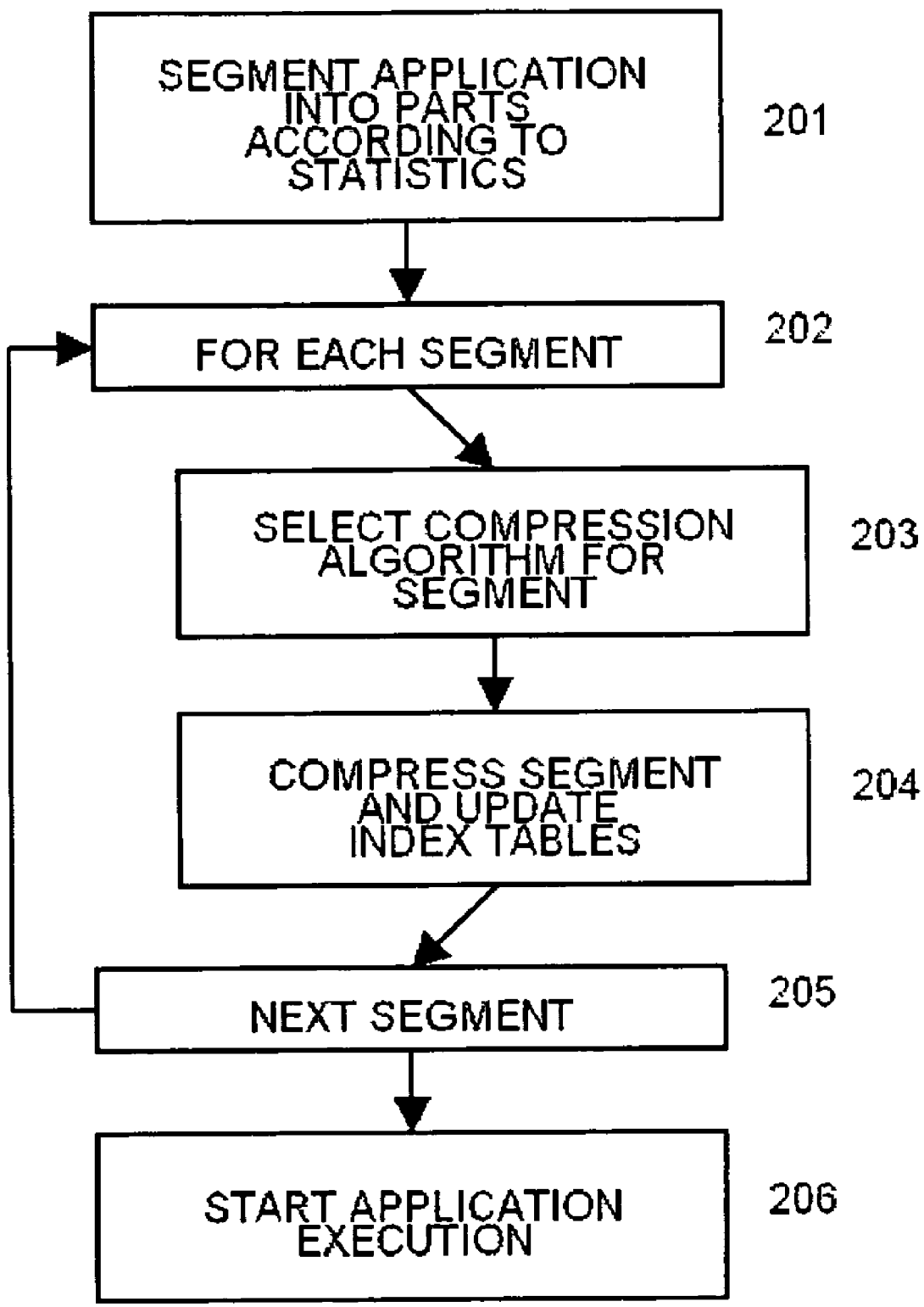
FIG. 2 is a flowchart of processing performed prior to execution of an application, in accordance with an embodiment of the invention.

FIG. 2 sets forth a flowchart of processing performed on an application prior to execution on the architecture shown in FIG. 1.

In accordance with a preferred embodiment of the present invention, the executable application is segmented into a plurality of areas at step 201. A typical executable application, for example, can contain code and data segments. One simple technique of application segmentation can be achieved by separating code from data regions within the application. Handling these areas differently is useful as they have different statistical properties, and, more importantly, they are treated in a different manner during execution. Instruction code, for example, typically is not modified during execution (with the exception of self-modifying code, which is not often used) while data is often modified.

Thus, it is preferable to do a statistical analysis of the application prior to execution and to segment the application based on the statistical properties of the different areas of the application. This can result in code being separated from data or, as depicted in FIG. 1, different areas of code and data being segmented as well. At steps 202-205, an appropriate compression scheme is selected for each segment of the application. Different compression schemes can be used for the various segments to maximize compression results and performance. Different code areas, for example, can contain a different statistical mix of instructions making a particular choice of algorithm more suitable. Large data areas, on the other hand, are often initially set to zeroes, which implies that an algorithm such as run length encoding would be a very effective compression approach. The present invention advantageously provides the flexibility to apply different strategies to different segments of the application. Once an appropriate compression algorithm has been selected for a particular segment at step 203, the segment is compressed and the index tables updated at step 204. Notably, for certain critical segments of the application, the appropriate choice may be to leave the segment uncompressed. Finally, at step 206, the application may be executed.

The mechanisms described above are readily extendable to encryption. The application can be segmented into areas that must be protected since they have either sensitive data or code—and other areas that can be left unencrypted for speed of execution. For those segments that are to be encrypted, a suitable encryption scheme is selected, and the segment is encrypted using the selected encryption scheme.

As depicted in FIG. 1, memory management middleware 145 is provided which handles the movement and processing of the different application segments. It is preferable that the memory management middleware 145 act in a dynamic manner, as illustrated by FIG. 3.

Figure 3:
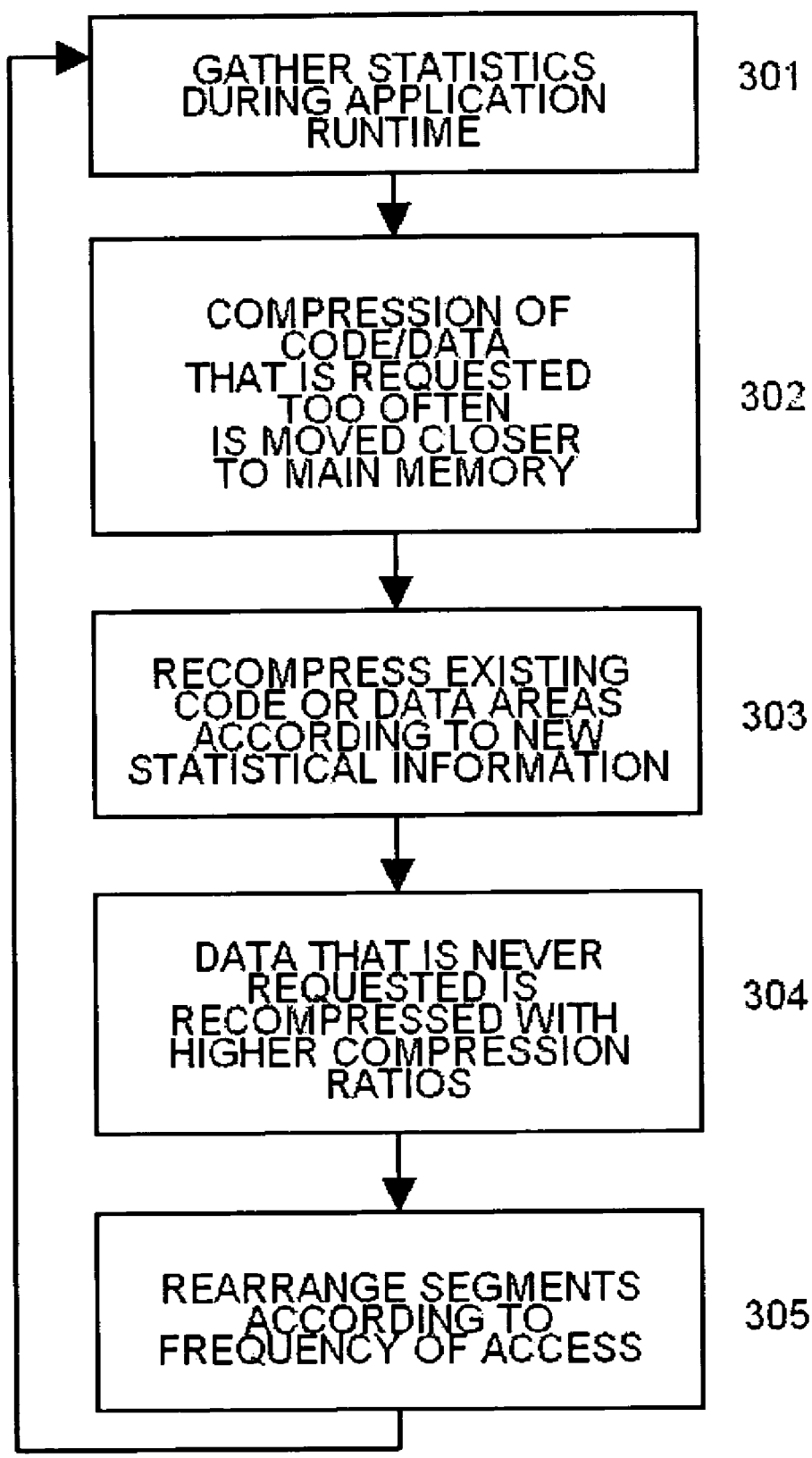
FIG. 3 is a flowchart of processing performed during application runtime by memory management middleware or hardware, in accordance with an embodiment of the invention.

FIG. 3 is a flowchart of processing performed by the memory management middleware, in accordance with a preferred embodiment of another aspect of the invention. At step 301, statistics are gathered during the application runtime. The particular form of the statistics gathered does not affect the nature of the invention, although it is preferable to gather information which reflects how often particular segments are being requested for processing as well as other metrics which may be used to aid the performance of the particular compression/encryption algorithms selected. A variety of dynamic operations can be carried out by the memory management middleware based on the dynamic statistical information that is gathered during the application's runtime, as reflected in steps 302-305 in FIG. 3.

At step 302, the compression of code/data that is requested too often can be moved "closer" to main memory. Given the typical overhead in using compression/encryption, it is generally beneficial to compress and decompress at levels of the memory hierarchy that are far away from the CPU. Thus, code that is executed very often can be designated to fall into a category of areas that are decompressed between main memory and the cache, rather than between the cache and the CPU. Fast execution of such code could warrant the increase in code size. Thus, with reference to FIG. 1, such segments of the code/data can be designed to utilize the compression/decompression engine 160 (or even be designated to avoid compression and use the bypass route 170 only) rather than the decompression engine 150 between the instruction cache 120 and the CPU 110.

At step 303, existing code or data areas can be recompressed according to the new statistical information. For example, the statistical properties of data that changes can warrant a change in compression algorithm that more effectively deals with the nature of the data as it currently exists in memory. Thus, although run length encoding may effectively deal with initially empty data areas, as those same data areas fill up with live data during runtime, a shift in compression strategy could be advantageous to maximizing performance of the architecture.

At step 304, data that is never or infrequently requested can be recompressed using stronger compression algorithms to save memory space. The selection of compression algorithm often reflects a tradeoff between speed of execution and the amount of space that is saved through the use of compression. Where the segment of the application is infrequently accessed, the increase in memory savings may readily justify the decrease in execution speed from using a slower but more effective compression algorithm.

At step 305, the areas can be rearranged according to the frequency of access. Thus, the memory management system is content-aware and is able to adapt to the particular application being executed and learn during its execution so that both compression/encryption and performance are optimized as much as possible. The allocation of different portions of the application to particular compression approaches and to particular locations in the memory hierarchy, thus, need not be static. The different segments of the application can be rearranged and reallocated during runtime based on the appropriate performance metrics collected.

The above implementation is merely illustrative of the invention. It will be understood by those of ordinary skill in the art that various changes may be made that are within the scope of the invention, which is to be limited only by the appended claims.

What is claimed is:

1. A system comprising:
   a processor and a memory unit in a memory hierarchy, the memory unit storing an application segmented into a plurality of areas;
   a first decompression engine interposed at a first position in the memory hierarchy so as to decompress a first area of the application; and
   a second decompression engine interposed at a second position in the memory hierarchy different from the first position in the memory hierarchy so as to decompress a second area of the application, the first area of the application being different from the second area of the application, the first decompression engine and the second decompression engine utilizing different compression schemes;
   said different compression schemes being chosen according to a statistical analysis of the different areas of the application.

2. The system of claim 1 farther comprising a decryption engine which decrypts at least one area of the application which is stored in an encrypted format in the memory unit.

3. The system of claim 1 wherein a first portion of the plurality of areas of the application are allocated to code portions of the application and a second portion of the plurality of areas of the application are allocated to data portions of the application.

4. The system of claim 1 wherein die first position in the memory hierarchy is between a cache and the processor and the second position in the memory hierarchy is between die cache and the memory unit.

5. The system of claim 1 wherein one of the first or second position in the memory hierarchy is between a first and second cache in the memory hierarchy.

6. The system of claim 1 wherein at least one area of the plurality of areas of the application is not compressed and wherein the system further comprises a path to the processor that bypasses at least one of the first and second decompression engines.

7. The system of claim 6 wherein the memory management module uses statistics collected during runtime to ascertain which areas of an application are being requested too often so that the areas can be moved closer to the memory unit in the memory hierarchy.

8. The system of claim 6 wherein the memory management module uses statistics collected during runtime to recompress some of the plurality of areas of the application.

9. The system of claim 6 wherein the memory management module uses statistics collected during runtime to ascertain which areas of an application are not being requested often so that the areas can be recompressed using a different compression approach providing a higher compression ratio.

10. The system of claim 6 wherein the memory management module rearranges areas of the application according to frequency of access.

11. The system of claim 1 wherein the first or second decompression engine also includes a compression engine if the area of the application being decompressed needs to be modified during runtime.

12. The system of claim 1 further comprising a memory management module.

13. The system of claim 1 wherein the system is an embedded system.

14. The system of claim 1 further comprising a third or more decompression engines interposed in the memory hierarchy.

15. A system comprising:
a processor and a memory unit in a memory hierarchy, the memory unit storing an application segmented into a plurality of areas;
a first decryption engine interposed at a first position in the memory hierarchy so as to decrypt a first area of the application;
a second decryption engine interposed at a second position in the memory hierarchy different from the first position in the memory hierarchy so as to decrypt a second area of the application, the first area of the application being different from the second area of the application, the first decryption engine and the second decryption engine utilizing different encryption schemes;.
said different encryption schemes being chosen according to a statistical analysis of the different areas of the application.

16. The system of claim 15 further comprising a third or more decryption engines interposed in the memory hierarchy.

17. The system of claim 15 further comprising a decompression engine which decompresses at least one area of the application which is stored in a compressed format in the memory unit.

18. The system of claim 15 wherein a first portion of the plurality of areas of application are allocated to code portions of the application and a second portion of the plurality of areas of the application are allocated to data portions of the application.

19. The system of claim 15 wherein at least one area of the plurality of areas of the application is not encrypted and wherein the system further comprises a path to the processor that bypasses the first and second decryption engines.

20. The system of claim 15 wherein the first or second decryption engine also includes an encryption engine if the portion of the application being decrypted by the decryption engine needs to be modified.

21. The system of claim 15 wherein the system is an embedded system.

* * * * *